May 25, 1965   E. ARMBRUSTER ET AL   3,185,064
ILLUMINATED INDICATOR DEVICE
Filed Jan. 16, 1963
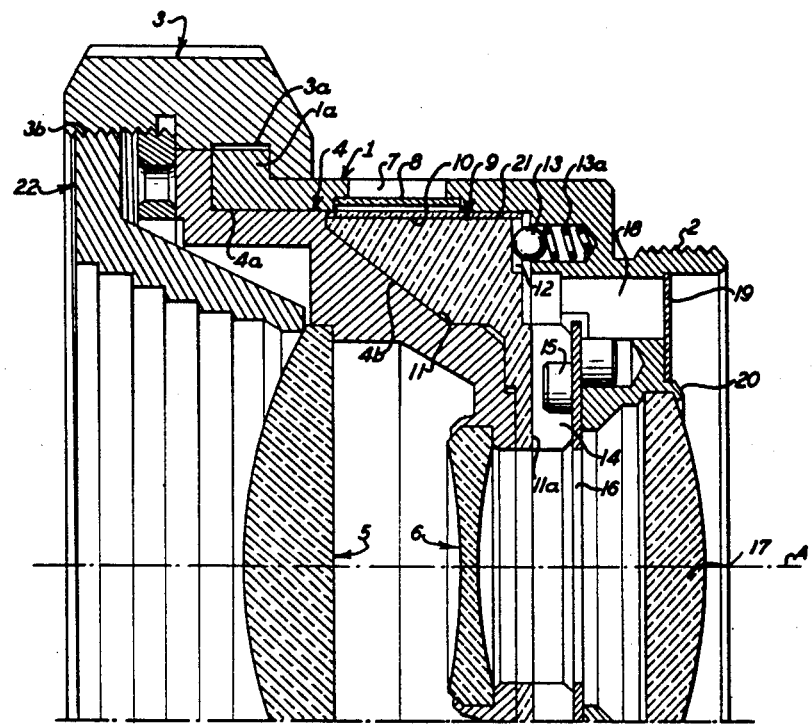
INVENTORS
EUGEN ARMBRUSTER &
FRANZ X. LEITMEIER

3,185,064
ILLUMINATED INDICATOR DEVICE
Eugen Armbruster and Franz Xaver Leitmeier, Munich, Germany, assignors to Optische Werke G. Rodenstock, Munich, Germany
Filed Jan. 16, 1963, Ser. No. 251,789
Claims priority, application Germany, Feb. 16, 1962, O 8,550
8 Claims. (Cl. 95—64)

This invention relates to illuminated indicator devices and more particularly to illuminated diaphragm dials for magnifying objectives which are conventional construcure of projector apparatus with an illuminated diaphragm dial as shown in U.S. Pat. 2,504,254.

It is known to illuminate diaphragm dials by various means. Known techniques involve substantial expenses. In addition, it is not possible with known techniques to provide optical effects other than reflection such as, for example, a filtering effect to suppress actinic light.

To achieve its principal object of avoiding the above-noted deficiencies of the prior art, the present invention proposes, according to a preferred embodiment, to install a light-conducting body in the generally circular or annular space which generally exists between the inner mounts normally provided for the lenses and the outer jacket of an objective, the jacket, for example, carrying a diaphragm dial which is to be illuminated.

Said light conducting body is preferably in the form of a ring of approximately right triangular cross-section and has a plane surface and a cylindrical surface respectively serving as light inlet and light outlet portions, said ring further having a conical surface at which total reflection can take place.

Such a ring, according to a feature of the invention, may be transparent or translucent. It may be colorless or colored inactinically. It may preferably be made of plastic. In addition, its coloring or reflection characteristic along the circumference may vary in which case, when the ring is rotated, more strongly or weakly light-conducting parts become operative in such a manner that the brightness of the dial can be adapted to prevailing requirements.

As an alternative within the broad scope of the invention it is possible to use a ring segment instead of using a full ring.

The ring or ring segment may be connected to a diaphragm setting ring so that it rotates with the same. It is possible to mount thereon an index which moves at the back of a dial fixedly arranged in the outer jacket of the objective. The diaphragm dial itself alternatively may be mounted or arranged on the ring by printing, stamping, casting, spraying, and so forth, and may move relative to an index line such as, for example, a wire mounted in an inspection opening in the jacket of the objective.

According to a further feature, the rotatably mounted ring or segment may be provided with detents in the form of bores or radial grooves into which, for example, an elastically positioned ball penetrates in such a manner that preferred diaphragm sizes can be set by touch.

Moreover, the ring may comprise guide slots or openings for bearing pins of diaphragm lamellae.

For the connection with actuating members such as, for example, a setting or adjusting ring externally surrounding the objective, or with a lens mount which is rotated for setting the associated diaphragm, or with a knob extending through a slot in the associated jacket, the ring may comprise additional fastening means such as, for example, pressed-in holes, grooves and the like.

An embodiment according to the invention is illustrated in the sole figure of the accompanying drawing in which half of a structure is shown in cross-section about its axis of symmetry.

The apparatus provided in accordance with the invention comprises generally a jacket 1 provided with a thread 2 and upon which is mounted a knob or rotatable member 3.

The apparatus further comprises a lens mount 4 supporting a front lens 5 and a center or intermediate lens 6.

The jacket 1 is provided with a window opening 7, the purpose of which will become hereinafter apparent. Covering the window 7 is a translucent or transparent member 8 which may be provided with either an index or a scale.

An important member of the apparatus is the ring 9, provided with a cylindrical surface 10, a conical surface 11 and a generally planar surface 11a, provided with a plurality of spaced recesses or notches 12 into which may extend a ball 13 loaded by a spring 13a.

The planar surface 11a is further provided with a plurality of radially extending or slanted guide grooves 14, into which extend the pins or protrusions 15 mounted on respective lamellae which cooperatively constitute an iris or diaphragm.

An objective lens 17 is provided and is supported in concentric relationship with respect to the front lens 5 and center lens 6 by means of a lens mount 20. Light passes in a direction first through the objective lens 17 then through the center lens 6 and finally through front lens 5 onto a light-sensitive paper (not shown).

The jacket 1 and the lens mount 20 constitute a unit provided with a light duct 18 by means of which light passes to the planar surface 11a of the ring 9. The said light duct may be positioned wholly within the jacket 1, or alternatively wholly within the lens mount 20, provided that light may be directed in such a manner as to be reflected by the conical surface 11 towards the window 7. A light permeable dust shield 19 is positioned to obturate the duct 18 and to prevent dust and foreign particles from passing into said duct.

A diaphragm dial 21 encircles the cylindrical surface 10 of the ring 9. An index and scale, are respectively provided on the dial 21 and the member 8 covering the window 7.

It will be noted that the lens mount 4 is a generally cylindrical member provided with a cylindrical surface 4a and a conical surface 4b, said surface 4a being of a greater diameter than the surface 4b, against which latter surface bears the conical surface 11 of the ring 9.

Said jacket 1 encircles the mount 4 and bears against the surface 4a while being spaced from the surface 4b and defining with the latter surface a space in which said ring 9 is accommodated.

Jacket 1 is provided with an annular key 1a which cooperates with a keyway 3a in the member 3 by means of which said member 3 is rotatable on and relative to the jacket 1. Member 3 is connected with the lens mount 4 and rotates the latter relative to said jacket 1. In addition, member 3 is provided with a threaded bore 3b, in which is threadably accommodated a member 22 which holds front lens 5 in position and provides for preventing an axial detachment between the elements 1, 4, 3, and 22.

The ring 9, which alternatively may consist of simply a segment of a ring or the functional equivalent thereof possessing a cross-section which is generally in the form of a triangle, is of a light permeable material, said material may be transparent or translucent. According to requirements, it may be colorless or actinically colored. It may have a color which varies circumferentially about the axis A of the apparatus. Further, it may have a reflecting power which also varies circumferentially about said axis A.

Relative to the ring 9, it is to be noted that the planar surface 11a constitutes a light inlet surface, whereas the conical surface 11 constitutes a light reflective surface and the cylindrical surface 10 constitutes a light outlet surface.

Rotation of the member 3 will cause a rotation of the lens mount 4, which in turn will rotate lenses 5 and 6. At the same time, ring 9 is rotated, thus causing a movement of guide slots 14 relative to pins or protrusions of the thereby resulting in an expansion or contraction of the iris constituted by the lamellae 16.

Movement of the ring 9 in the form of a rotational displacement about said axis A, will be indicated by the scale or index on the dial 21, which will give an indication in cooperation with the index or scale on the member 8 in the window 7.

From what has been stated above, it will be appreciated that the ring 9 or the functional equivalent thereof, is a light permeable body which is installed in or fitted on the mount 4 of the front lenses of an objective, and that this body compromises a front face facing the light inlet side of the objective and a side face facing the outer jacket of the objective. It will be further noted that a dial reading is provided in association with a diaphragm or iris arrangement, the reading of which is facilitated by light permeating the aforesaid body and directed at said body by means of a light conducting port or duct.

It will be further noted that the light conducting body of the invention is arranged between the mounts of two lenses or lens arrangements and an outer jacket provided in association therewith.

There will now be obvious to those skilled in the art many modifications and variations of the structure set forth above. These modifications and variations will not depart from the scope of the invention, if defined by the following claims.

What is claimed is:

1. In an optical system usable in a projector, a rotatable light permeable ring having an inner conical surface, an outer cylindrical surface and a planar surface; the planar, cylindrical and conical surface of the ring defining a triangular cross-section and respectively constituting light inlet, light outlet and reflective surfaces; said conical surface being positioned relative to said light inlet and outlet surfaces to reflect the light admitted through the inlet surface in a direction perpendicular to the outlet surface, first and second members encircling the cylindrical surface of said ring respectively, one of said members being fixed and the other rotatable with said ring, one of the said fixed and rotatable members having an index and the other having a scale, the member rotatable with the ring being illuminated by light from said ring, and an iris coupled to said ring such that rotation of said ring operates said iris.

2. Apparatus usable in a projector comprising front and intermediate lenses and a mount supporting said lenses in concentric and axially spaced relation, a cylindrical jacket encircling said mount and provided with a window opening, means connecting said mount and jacket for relative rotational displacement, a light permeable rotatable ring having an inner conical surface bearing against said mount and an outer cylindrical surface facing said jacket and the opening therein, said ring further having a planar surface generally parallel to said lenses and perpendicular to the outer cylindrical surface of the ring; the planar, cylindrical and conical surfaces of the ring defining a generally triangular cross-section and respectively constituting light inlet, light outlet and reflective surfaces; said conical surface being positioned relative to said light inlet and outlet surfaces to reflect the light admitted through the inlet surface in a direction perpendicular to the outlet surface, first and second members in said window opening and encircling the cylindrical surface of said ring respectively, one of said members having an index and the other of said members having a scale, said second member being rotatable with and illuminated by light from said ring, and an iris concentric with said lenses and consisting of a plurality of lamellae associated with said ring so that rotation of said ring operates said iris.

3. In an optical system usable in a projector: front and intermediate lenses and a mount supporting said lenses in concentric and axially spaced relation, said mount having concentric cylindrical and conical surfaces, a cylindrical jacket on said mount bearing against said cylindrical surface and encircling said conical surface, said jacket being provided with a window opening, means connecting said mount and jacket for relative rotational displacement while preventing axial displacements therebetween, a light permeable ring between said mount and jacket, said ring having an inner conical surface against the conical surface of said mount and an outer cylindrical surface concentric with the lenses and facing said jacket and the opening therein, said ring further having a planar surface generally parallel to said lenses and perpendicular to the cylindrical surface of the ring; the planar, cylindrical and conical surfaces of the ring constituting respective light inlet, light outlet and reflective surfacees; said conical surface being positioned relative to said light inlet and outlet surfaces to reflect the light admitted through the inlet surface in a direction perpendicular to the outlet surface first and second members in said window opening and encircling the cylindrical surface of said ring respectively, one of said members having an index and the other of said members having a scale, said second member being illuminated by light from said ring, the planar surface of said ring being provided with guide slots, an iris concentric with said lenses and consisting of a plurality of lamellae including protrusions positioned in said guide slots whereby rotation of said ring operates said iris, an objective lens, a mount supporting said objective lens in said jacket in concentric relation with the first said lens, said iris being positioned between the intermediate and objective lenses, said jacket and the latter said mount constituting a part provided with a light duct leading to the planar surface of the ring.

4. In a optical system usable in a projector, the combination comprising front and intermediate lenses and a cylindrical mount supporting said lenses in concentric and axially spaced relaton, said mount having cylindrical and conical surfaces, which are concentric with the lenses, a cylindrical jacket on said mount bearing against said cylindrical surface and encircling said conical surface, said jacket being provided with a window opening, means connecting said mount and jacket for relative rotational displacement while preventing axial displacements therebetween, a light permeable ring between said mount and jacket, said ring having an inner conical surface against the conical surface of said mount and an outer cylindrical surface concentric with and facing said jacket and the opening therein, said ring further having a planar surface generally parallel to said lenses and perpendicular to the outer cylindrical surface of the ring; the planar, cylindrical and conical surfaces of the ring defining a triangular cross-section and respectively constituting light inlet, light outlet and reflective surfaces; said conical surface being positioned relative to said light inlet and outlet surfaces to reflect the light admitted through the inlet surface in a direction perpendicular to the outlet surface first and second members in said window opening and encircling the cylindrical surface of said ring respectively, one of said members having an index and the other of said members having a scale, said second member being illuminated by light from said ring, said ring being provided in its planar surface with spaced recesses, a spring-loaded detent on said jacket for engaging selectively in said recesses upon relative rotation between said ring and jacket, the planar surface of said ring being further provided with guide slots, an iris concentric with said lenses and consisting of a plurality of lamellae including protrusions positioned in said guide slots whereby rotation of said ring operates said iris, an objective lens, a mount supporting said objective lens in said jacket in concentric relation with the first said lenses, said iris being positioned between the intermediate and objective lenses, said jacket and the latter said mount constituting a part provided with a light duct leading to the planar surface of the ring, and a light permeable dust shield obturating said duct.

5. The combination as claimed in claim 4 wherein the ring has a coloring which varies circumferentially about the axis thereof.

6. The combination as claimed in claim 4 wherein the ring has a reflectivity which varies circumferentially about the axis thereof.

7. The combination as claimed in claim 4 wherein the ring is transparent.

8. The combination as claimed in claim 4 wherein the ring is translucent.

References Cited by the Examiner
UNITED STATES PATENTS

| | | | |
|---|---|---|---|
| 2,504,254 | 4/50 | De Grave | 88—24 |
| 2,684,611 | 7/54 | Hinden | 95—64 X |
| 3,106,883 | 10/63 | Erbe | 95—64 |

NORTON ANSHER, *Primary Examiner.*

EMIL G. ANDERSON, *Examiner.*